Patented Dec. 8, 1953

2,662,083

UNITED STATES PATENT OFFICE 2,662,083

HETEROCYCLIC POLYMETHYLENE - BIS-QUATERNARY AMMONIUM SALTS AND PROCESS FOR PREPARING SAME

Cyril Jack Eastland, Edwin Percival Taylor, and Henry Oswald Jackson Collier, Bethnal Green, London, England, assignors to Allen & Hanburys Limited, London, England, a British company No Drawing. Application September 28, 1951, Serial No. 248,874

Claims priority, application Great Britain October 24, 1950

12 Claims. (Cl. 260—286)

This invention relates to compounds having curarising properties.

The novel compounds of the present invention are heterocyclic polymethylene-bis-quaternary ammonium salts of the general formula:

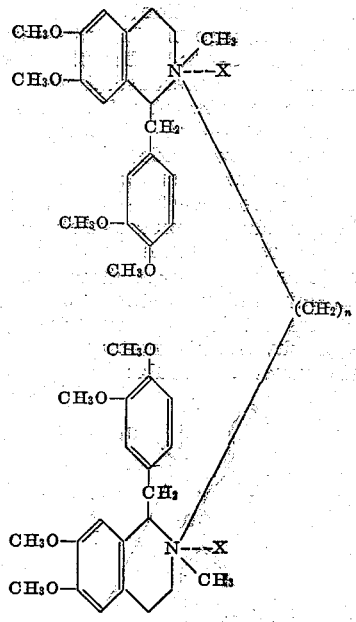

where X is an anion, and $n=9$, 10, 11 or 12, and have curarising properties.

The novel compounds of the present invention may be prepared either:

(a) By refluxing an excess of laudanosine with a polymethylene dihalide containing from nine to twelve carbon atoms in the molecule, in an inert solvent for a prolonged period, e. g. several days; or (b) By refluxing tetrahydropapavorine with a polymethylene dihalide containing from nine to twelve carbon atoms in the molecule, in an inert solvent for a prolonged period, e. g. several days, and treating the product with an excess of a methyl halide or methyl sulphate.

The inert solvent may, for example, be an aromatic hydrocarbon such as benzene, or ethyl alcohol.

The following examples serve to illustrate the invention:

Example 1.—αω - Decamethylene-bis - [1:2:3:4-tetrahydro - 6:7 - dimethoxy - 1 - (3:4-dimethoxybenzyl) -2-methylisoquinolinium iodide]

Decamethylene di-iodide (1 gm.) and laudanosine (3.63 gm.=100% excess) were refluxed on the steam bath with 25 ml. of dry benzene for 108 hours. After cooling, filtering and washing the residue with dry benzene, the product was dried, dissolved in methyl alcohol, and poured into excess ether. The resulting granular precipitate was filtered, and precipitated in a similar way, after which it was found possible to recrystallise from methyl alcohol and ether in the normal manner. The yield of cream coloured granules was 1.1 gms. which softened at 136–138° C. and melted at 146–148° C.

Found: C, 55.9; H, 6.65; N, 2.4; I, 22.6.

requires: C, 56.3; H, 6.7; N, 2.5; I, 22.9%.

Example 2.—αω-Decamethylene - bis - [1:2:3:4-tetrahydro-6:7-dimethoxy-1-(3:4 - dimethoxybenzyl) - 2 - methylisoquinolinium methosulphate]

(1) A mixture of decamethylene di-iodide (11.8 gms.), tetrahydropapaverine hydriodide (29.7 gms., 2 molecular proportions+5%), anhydrous potassium carbonate (15 gms.) and 95% alcohol (360 mls.) was refluxed for 104 hours. The alcohol was then distilled off, and any residual water removed by azeotropic distillation with benzene. The residue was then dissolved as far as possible in hot dry benzene, filtered, and the solvent recovered (the last traces being removed in vacuo). The oily residue was then dissolved in the minimum quantity of anhydrous alcohol, and acidified to Congo red with dry alcoholic hydrogen chloride. After cooling, the resulting dihydrochloride was filtered off, washed with cold alcohol, and dried, giving 25.6 gms. of crude material of M. P. 236–238° C. This was recrystallised from 500 mls. of boiling water, when the dihydrochloride of $a\omega$-bis - [1:2:3:4 - tetrahydro-6:7-dimethoxy-1-(3:4-dimethoxybenzyl)-isoquinolyl] decane was obtained as a colourless powder, of M. P. 242-244° C. (decomp.). Yield, 20.5 gms. (76%).

Found: C, 66.7; H, 7.75; N, 3.2; Cl, 7.95. $C_{50}H_{70}O_8N_2Cl_2$ requires: C, 66.9; H, 7.9; N, 3.1; Cl, 7.9%.

(ii) The above dihydrochloride (20 gms.) was dissolved in boiling water (700 mls.), made alkaline with sodium hydroxide, saturated with sodium chloride, and the brown oil which separated extracted with hot benzene. The benzene solution was shaken with solid potassium hydroxide, filtered, and concentrated to approximately 100 mls. A solution of dimethyl sulphate (8.45 gms., 50% excess) in dry benzene (25 mls.) was added, and the mixture refluxed for 48 hours. The benzene was then decanted from the gummy solid which had separated, and the latter washed three times by decantation with hot benzene. After drying in vacuo, the friable residue was dissolved in hot anhydrous alcohol, ether added to the warm solution, and the mixture left to crystallise slowly.

After two further recrystallisations, the product was obtained as a cream coloured granular powder (10 gms.) which melted at 172–174° C. after darkening at 164–166° C.

Found: C, 60.1; H, 7.75; N, 2.5; S, 5.9. $C_{54}H_{80}O_{16}N_2S_2$ requires: C, 60.2; H, 7.5; N, 2.6; S, 5.95%.

*Example 3*

Following the procedure set forth in Example 1, the following compound was also prepared: $a\omega$-Nonamethylene-bis-[1:2:3:4-tetrahydro-6:7-dimethoxy-1-(3:4 - dimethoxybenzyl) -2-methylisoquinolinium iodide].

The product was obtained as granules from butyl alcohol, which softened at 130–132° C. and melted at 139–141° C.

Found: N, 2.7; I, 23.1. $C_{51}H_{72}O_8N_2I_2$ requires: N, 2.6; I, 23.2%.

*Example 4*

Following the procedure set forth in Example 2, the following compound was prepared: $a\omega$-Undecamethylene-bis-[1:2:3:4 - tetrahydro-6:7-dimethoxy-1-(3:4 - dimethoxybenzyl) 2 - methylisoquinolinium methosulphate].

The product was obtained as granules from alcohol/ether, which melted at 187–189° C. after darkening at 170° C.

Found: C, 60.8; H, 7.3; N, 2.7; S, 5.85. $C_{55}H_{82}O_{16}S_2N_2$ requires: C, 60.55; H, 7.6; N, 2.6; S, 5.9%.

*Example 5*

Following the procedure set forth in Example 2 the following compound was also prepared: $a\omega$-Dodecamethylene - bis - [1:2:3:4-tetrahydro-6:7 - dimethoxy - 1 - (3:4 - dimethoxybenzyl)-2-methylisoquinolinium methosulphate].

The product was obtained as granules from alcohol/ether, which softened at 202° C. and melted at 205–207° C.

Found: C, 61.0; H, 7.65; N, 2.7; S, 5.9. $C_{56}H_{84}O_{16}S_2N_2$ requires: C, 60.9; H, 7.7; N, 2.5; S, 5.8%.

Preliminary pharmacological tests indicate that the compounds of the present invention possess marked paralysing activity in the cat, approximating to that of tubocurarine dimethylether, the compounds where $n=9$ or 10 being the most active. They are antagonised by neostigmine.

What we claim is:

1. Heterocyclic polymethylene-bis-quaternary ammonium salts of the general formula:

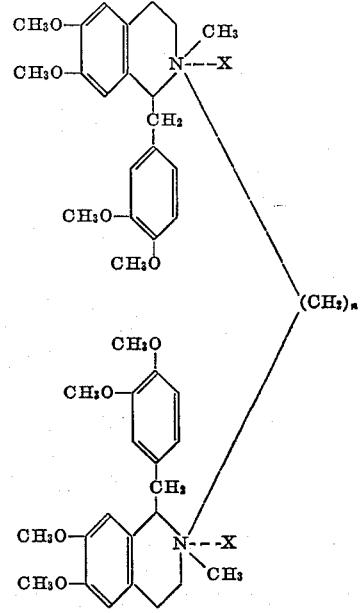

where X is an anion and $n$ is an integer which is at least nine and less than thirteen.

2. $a\omega$-Decamethylene-bis-[1:2:3:4-tetrahydro-6:7 - dimethoxy - 1 - (3:4 - dimethoxybenzyl) -2-methylisoquinolinium iodide].

3. $a\omega$-Decamethylene-bis-[1:2:3:4-tetrahydro-6:7 - dimethoxy - 1 - (3:4 - dimethoxybenzyl) -2-methylisoquinolinium methosulphate].

4. $a\omega$ - Nonamethylene-bis-[1:2:3:4 - tetrahydro-6:7-dimethoxy-1-(3:4 - dimethoxybenzyl) -2-methylisoquinolinium iodide].

5. $a\omega$ - Undecamethylene-bis-[1:2:3:4 - tetrahydro-6:7-dimethoxy-1-(3:4-dimethoxybenzyl) -2-methylisoquinolinium methosulphate].

6. $a\omega$ - Dodecamethylene-bis-[1:2:3:4 - tetrahydro-6:7-dimethoxy-1-(3:4-dimethoxybenzyl) -2-methylisoquinolinium methosulphate].

7. A process for the manufacture of heterocyclic polymethylene-bis-quaternary ammonium salts of the general formula:

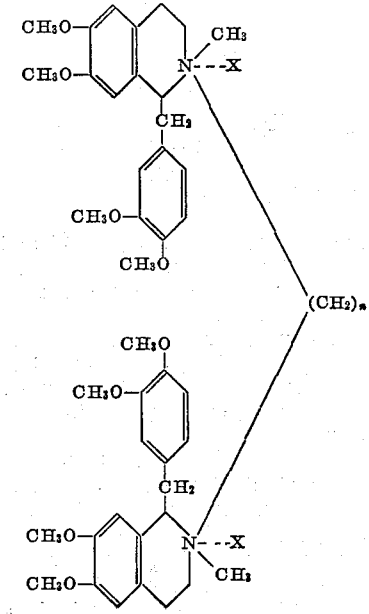

selected from the group consisting of halides and methosulphate where X is an anion and $n$ is an integer which is at least nine and less than thirteen, which comprises refluxing an excess of laudanosine with a polymethylene dihalide containing at least nine and less than thirteen carbon atoms in the molecule, in an inert solvent for a prolonged period.

8. A process for the manufacture of heterocyclic polymethylene-bis-quaternary ammonium salts of the general formula:

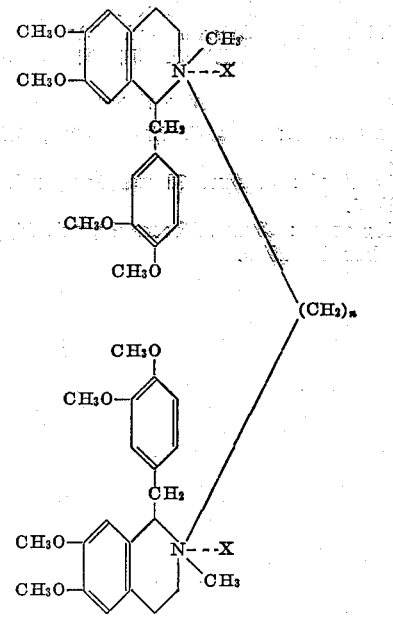

selected from the group consisting of halides and methosulphate where X is an anion and $n$ is an integer which is at least nine and less than thirteen, which comprises refluxing tetrahydropapaverine with a polymethylene dihalide containing at least nine and less than thirteen carbon atoms in the molecule, in an inert solvent for a prolonged period, and treating the product thus obtained with an excess of a methyl compound selected from the group consisting of methyl halides and methyl sulphate.

9. A process for the manufacture of heterocyclic polymethylene-bis-quaternary ammonium salts of the general formula:

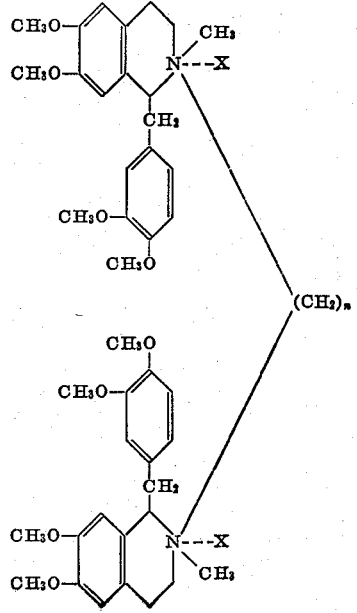

selected from the group consisting of halides and methosulphate where X is an anion and $n$ is an integer which is at least nine and less than thirteen, which comprises refluxing an excess of laudanosine with a polymethylene dihalide containing at least nine and less than thirteen carbon atoms in the molecule, in an aromatic hydrocarbon for a prolonged period.

10. A process for the manufacture of heterocyclic polymethylene-bis-quaternary ammonium salts of the general formula:

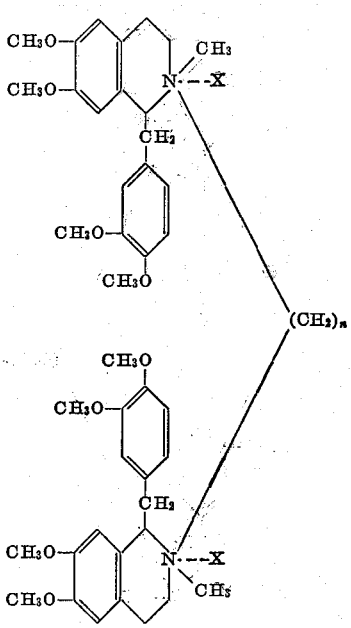

selected from the group consisting of halides and methosulphate where X is an anion and $n$ is an integer which is at least nine and less than thirteen, which comprises refluxing an excess of laudanosine with a polymethylene dihalide containing at least nine and less than thirteen carbon atoms in the molecule, in ethyl alcohol for a prolonged period.

11. A process for the manufacture of heterocyclic polymethylene-bis-quaternary ammonium salts of the general formula:

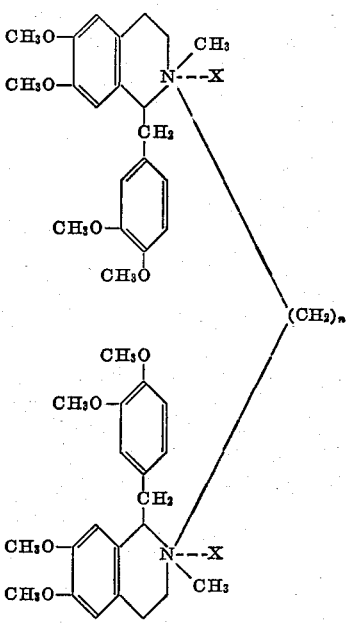

selected from the group consisting of halides and methosulphate where X is an anion and $n$ is an integer which is at least nine and less than thirteen, which comprises refluxing tetrahydropapaverine with a polymethylene dihalide containing at least nine and less than thirteen carbon atoms in the molecule, in an aromatic hydrocarbon for a prolonged period, and treating the product thus obtained with an excess of a methyl compound selected from the group consisting of methyl halides and methyl sulphate.

12. A process for the manufacture of heterocyclic polymethylene-bis-quaternary ammonium salts of the general formula:

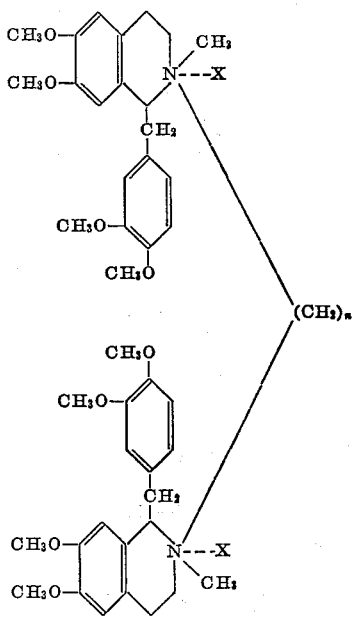

selected from the group consisting of halides and methosulphate where X is an anion and $n$ is an integer which is at least nine and less than thirteen, which comprises refluxing tetrahydropapaverine with a polymethylene dihalide containing at least nine and less than thirteen carbon atoms in the molecule, in ethyl alcohol for a prolonged period, and treating the product thus obtained with an excess of a methyl compound selected from the group consisting of methyl halides and methyl sulphate.

CYRIL JACK EASTLAND.
EDWIN PERCIVAL TAYLOR.
HENRY OSWALD JACKSON COLLIER.

References Cited in the file of this patent

Barlow et al.: Brit. J. Pharmacol., vol. 3, pp. 298–304.
Craig et al.: J. Am. Chem. Soc., vol. 70, pp. 2783–2785.
Taylor et al.: Chem. Abstracts, vol. 44, p. 7986, September 10, 1950.